Patented Jan. 13, 1948

2,434,625

UNITED STATES PATENT OFFICE 2,434,625

PREPARATION OF ALKALI METAL ASCORBATES

Simon L. Ruskin, New York, N. Y., assignor to Frances R. Ruskin

No Drawing. Application November 1, 1944, Serial No. 561,505

3 Claims. (Cl. 260—344.5)

The present invention relates to the manufacture of alkali metal salts of ascorbic acid, also known as cevitamic acid or vitamin C.

The present application is a continuation-in-part of my copending applications Serial No. 50,237, filed November 16, 1935, now Patent No. 2,400,171, issued May 14, 1946, and Serial No. 501,854, filed September 10, 1943.

In the methods heretofore employed for the manufacture of the alkali metal salts of ascorbic acid, it has been impossible to obtain stable and hence pure metal ascorbates, and in addition, the yields were considerably below theoretical. This result has been due to the fact that ascorbic acid is unstable in air and is further decomposed by heat, and in the presence of alkalis, the alkali metal salts being likewise subject to decomposition.

This instability of the salts has militated against their preparation in the solid form, for the manufacture of tablets, pills, and the like, by the evaporation of aqueous solutions of the salts. During such evaporation, considerable loss of ascorbic acid occurs and likewise decomposition of the salts, so that the ultimate solid product, in addition to containing the product of the decomposition, which in certain instances may be toxic, also contains less than the original proportion of ascorbic acid; in other words, the ascorbic acid titer of the solid product is much below that of the original aqueous solution.

It is the general object of the invention to provide an improved process for the manufacture of the alkali metal salts of ascorbic acid, whereby stable products substantially free from toxic and other products of decomposition are obtained.

It is a further object of the invention to provide alkali metal salts of ascorbic acid in a form in which they can be readily converted into tablet or pill form for peroral use.

A further object of the invention is to provide a method of manufacture which yields alkali metal ascorbates in which the ascorbic acid titer based on the original amount of ascorbic acid employed, is practically theoretical.

A still further object of the invention is to provide a process of manufacture of the aforementioned salts which is so conducted, and yields the product in such condition, that the salts can be put into tablet or other solid form and will remain stable in air for long periods of time without the aid of a stabilizing agent.

It is also an object of the invention to provide a process for the manufacture of ascorbic acid salts of the alkali metals in the course of which it is unnecessary to add a stabilizer to the solutions to prevent loss of ascorbic acid and/or decomposition of the salts.

It is still another object of the invention to provide solutions of alkali metal ascorbates for injection purposes which are free from decomposition products and are stabilized for indefinite storage in ampule form.

The above and other objects of the invention, whose nature will appear as the more detailed description progresses are attained by conducting the salt forming reaction under anhydrous conditions, and by the use of the hydroxide or methylate of the metal dissolved or suspended in substantially anhydrous methyl alcohol. By such procedure I am able to produce practically theoretical yields of the salt and with a minimum or even total absence of loss by decomposition or otherwise. In the conducting of my improved process, it is not necessary to add any stabilizing agent during the course of the process or to any final solid product. Whereas heretofore the sodium salt, for example, of ascorbic acid has never been prepared for the market in the solid condition by reason of the losses on decomposition above referred to, by my improved process there are obtained solid products which can be readily prepared for the market in the form of tablets or pills without any necessity for incorporating therein a stabilizing agent. The present invention makes the alkali metal salts of ascorbic acid available in practical tablet form for oral administration or for the preparation of a solution for immediate injection. The alkali metal ascorbates are particularly indicated for the treatment of conditions requiring the administration of the vitamin C radical, as in vitamin C deficiency diseases, or for use together with more or less toxic therapeutic agents in order to reduce their toxicity; the salts are indicated also for use with those patients who cannot tolerate free ascorbic acid in the alimentary tract, and they represent agents for the injection of the vitamin C radical which are substantially free from irritation on injection.

The term "alkali metal ascorbates" and equivalent expressions are to be understood as including not only the sodium, potassium and lithium salts, but also the ammonium salt, the ammonium radical being considered, in accordance with accepted practice, as a metal radical, and being grouped with the alkali metals.

The following examples illustrate satisfactory procedures for carrying out the invention.

Example 1

88 g. (0.5 mole) of ascorbic acid were dissolved in 600 cc. hot absolute methyl alcohol. While still hot it was treated under stirring with 250 cc. of a warm solution of sodium methylate containing 12.5 g. sodium (theory 11.5 g.). The sodium methylate solution was made by dissolving the sodium metal in absolute methyl alcohol and then filtering it through "Filter-Cel." The combined solutions were stirred to insure complete reaction and until the resulting precipitate of sodium ascorbate turned crystalline. This took about fifteen minutes. The sodium ascorbate was then filtered with suction and washed with a little methyl alcohol. It could be dried in vacuo at a temperature as high as 100° C. Yield 95 grams or 95%.

Titration with 0.1 N iodine showed the product to be practically 100% pure.

In place of the metal methylates, illustrated by the above example, the hydroxides may be employed. While the highly reactive metals sodium and potassium might be reacted with the ascorbic acid in a substantially anhydrous medium, like 95% methyl alcohol, it is preferable to react the sodium or potassium first with the alcohol and then treat ascorbic acid with the metal alcoholate.

I prefer to employ absolute methyl alcohol in my process, but 95% alcohol is generally satisfactory; and in the appended claims the expression "substantially anhydrous" is to be understood as embracing solutions containing from about 95% to 100% methyl alcohol as the solvent. It will be understood that the potassium and lithium salts can be prepared similarly to the sodium salt. The ammonium salt can be conveniently prepared by passing substantially dry ammonia gas into a solution of ascorbic acid in approximately anhydrous methyl alcohol, like 95% methyl alcohol, or in the following manner:

Example 2

176 g. of ascorbic acid were dissolved in 1000 cc. of hot absolute methyl alcohol. To this was added under stirring a cold saturated solution of alcoholic ammonia until the reaction mixture smelled strongly of ammonia. On cooling and concentrating under vacuum, ammonium ascorbate was precipitated. Yield quantitative.

As already indicated, the salts of the present invention can be administered by mouth or by intramuscular or intravenous injection. The dosage of the salts will in general correspond to the vitamin C requirements; the salts are, however, nontoxic even in considerable overdoses.

The solid products, as already stated, require no stabilizer; however when the products are put up in solution in ampules, in which they are likely to remain for a considerable time, it is advisable to add a suitable stabilizing agent. Satisfactory stabilizers are acetanilid, and the alkali metal, and preferably the sodium, sulfites and bisulfites. Sodium citrate is a satisfactory stabilizer for the sodium ascorbate. The various sugars, like dextrose, sucrose, sorbose and galactose exert a considerable stabilizing effect. I have found that the sugars generally, and particularly dextrose, have an unexpectedly desirable action when employed as an auxiliary stabilizer in connection with the use of the alkali metal sulfites, including the bisulfites, and especially sodium sulfite, for they appear to enhance the stabilizing action of the sulfite much beyond any stabilizing action that they themselves have. The stabilizer may be employed in an amount of the order of about ½ of one per cent or more by weight of the ascorbate; while the sugar, when employed, is present in such an amount as to constitute approximately five to ten per cent by weight of the whole solution. A small amount of free ascorbic acid may be used with the stabilizing agent; thus the ascorbate solution can contain ½% of sodium sulfite or bisulfite, based on the weight of ascorbate salt, together with enough free ascorbic acid to give the solution a pH of about 6.0–6.5.

The ampuled solutions may be of 5% or 10% concentration, but higher concentrations like 15% or 20% are feasible. Thus to prepare an ampule containing the 10% solution, ½ gm. of, for example, anhydrous sodium ascorbate is dissolved in 5 cc. of distilled water to which is preferably added 2.5 to 3 mg. of sodium sulfite or bisulfite, together with about ½ gm. of dextrose, sorbose, or other sugar. The sugar has a stabilizing effect both on the sodium ascorbate and on the sodium sulfite or bisulfite. Where the ampules are to be used within about two months or so after preparation, the sugar may be omitted. Where storage is to last for a period of six months or over, it is preferable to use the combined stabilization effected by the sulfite and the sugar. The other alkali metal ascorbates can be similarly packaged.

In preparing the salts in tablet or pill form, suitable binders like sugar or starch may be incorporated in known manner. The products are also advantageously marketed in the crystal form in which they are manufactured which facilitates the making up of the solutions by the physician preliminary to injection. Thus sodium ascorbate powder prepared as above described can be packaged dry in sterile ampules for mixing with sterile water by the physician directly before use, whereby a sterile, neutral solution of sodium ascorbate is made available without any decomposition and without the presence of any stabilizing agents.

A further use to which the alkali metal ascorbates and especially sodium ascorbate may be put when prepared as above described and thereby kept free from decomposition products, is to replace free vitamin C itself in multi-vitamin mixtures, such as those marketed today for use by the general public and containing, for example, vitamins A, B-complex, and C, and if desired also other vitamins, either all of the known members of the B-complex being present, or certain of them like $B_1$ and $B_6$. In such preparations, the vitamin C has a decomposing or deteriorating action on the vitamin A component, whereas sodium ascorbate has no such action.

The alkali metal ascorbates of the present invention, because of their freedom from decomposition products, can be employed further for the manufacture of other metal ascorbates in the pure condition by reacting with a compound of such other metal which will enter into double decomposition with the alkali metal ascorbate, as will readily be understood.

I claim:

1. Process for the manufacture of alkali metal ascorbates of crystalline character which in the solid condition are stable in air over long periods of time, which comprises reacting a solution of ascorbic acid in substantially anhydrous methyl alcohol with a member of the group consisting of alkali metal alcoholates and inorganic bases of the alkali metals.

2. Process for the manufacture of an improved form of sodium ascorbate which in the solid condition is stable in air over long periods of time, which comprises reacting a solution of ascorbic acid in heated, substantially anhydrous methyl alcohol with sodium methylate, and separating the formed precipitate of sodium ascorbate.

3. Process for the manufacture of an improved form of sodium ascorbate which in the solid condition is stable in air over long periods of time, which comprises reacting a solution of ascorbic acid in substantially anhydrous methyl alcohol with a solution of sodium methylate in substantially anhydrous methyl alcohol, and separating the formed precipitate of sodium ascorbate.

SIMON L. RUSKIN.

REFERENCES CITED

The following references are of record in the file of this patent:

UNITED STATES PATENTS

| Number | Name | Date |
| --- | --- | --- |
| 2,333,417 | King et al. | Mar. 4, 1941 |

OTHER REFERENCES

A Szent-Gyorgyi, Biochemical Jr., vol. 22, 1928, page 1394.

Karrer et al., Biochemical Z., 258 (1933), page 14.